(12) United States Patent  
Cahilly

(10) Patent No.: US 8,226,791 B1  
(45) Date of Patent: Jul. 24, 2012

(54) SEALING DEVICE FOR A SURFACE

(76) Inventor: Bambi Lyn Cahilly, Wrightwood, CA (US)

( * ) Notice: Subject to any disclaimer, the term of this patent is extended or adjusted under 35 U.S.C. 154(b) by 0 days.

(21) Appl. No.: 12/807,039

(22) Filed: Aug. 25, 2010

Related U.S. Application Data

(62) Division of application No. 10/777,048, filed on Feb. 13, 2004, now abandoned.

(51) Int. Cl.  
*B29C 65/00* (2006.01)  
*B32B 37/02* (2006.01)  
*B32B 38/04* (2006.01)

(52) U.S. Cl. ........ 156/257; 156/248; 156/249; 156/253; 156/268; 156/270; 156/513; 156/514

(58) Field of Classification Search .............. 156/248, 156/249, 252, 253, 257, 268, 270, 513, 514, 156/256, 271, 265, 264  
See application file for complete search history.

(56) References Cited

U.S. PATENT DOCUMENTS

| 1,983,323 | A | * | 12/1934 | Stokes ........................ 493/55 |
| 4,155,801 | A | * | 5/1979 | Provancher .................. 216/43 |
| 6,007,754 | A | * | 12/1999 | Crawford et al. ............ 264/219 |
| 7,285,332 | B2 | * | 10/2007 | Hosoi et al. .................. 428/412 |
| 7,887,666 | B2 | * | 2/2011 | Nguyen ......................... 156/253 |

FOREIGN PATENT DOCUMENTS

EP 468204 * 1/1992

* cited by examiner

*Primary Examiner* — Linda L Gray  
(74) *Attorney, Agent, or Firm* — Theodore J. Bielen, Jr.

(57) ABSTRACT

A sealing device for a well plate and process for fabrication of the device. The device includes a first layer and two adhesive layers. A bore is formed through the first layer and the two adhesive layers. A translucent second layer adheres to the first adhesive layer of the first layer to seal the well plate. The process for fabricating a sealing device provides a first layer with a first side having a first adhesive layer and a second side having a second adhesive layer. A second layer adheres to the first adhesive layer. A bore is formed through the first layer, first adhesive layer, second adhesive layer, and second layer, after removal of the second layer from the first adhesive layer. Yet another layer adheres to the first adhesive layer over the bore. A coloration element may be added to the device.

3 Claims, 4 Drawing Sheets

SEALING DEVICE FOR A SURFACE

CROSS-REFERENCES TO RELATED APPLICATION

The present application is a division of U.S. patent application Ser. No. 10/777,048, filed 13 Feb. 2004, now abandoned.

BACKGROUND OF THE INVENTION

The present invention relates to a novel and useful sealing device for a surface.

Well plates are used extensively to contain chemical entities for the purpose of testing, culturing, storing and the like. Typically a well plate includes a multiplicity of wells arranged in columns and rows totaling to a standard number such as 96, 384, and the like. Also other surfaces, such as microchips, medical devices, films and the like, require sealing.

In the past, seals have been used with well plates to isolate the individual wells from the environment in which the well are located. Unfortunately, adhesives used with prior sealing films have interacted with the chemicals found in the wells and/or testing devices and apparatus contacting the wells causing unreliable testing results. Also, other well plates beneath seals have been contaminated by adhesives found in the overlying layers of such seals.

A sealing device for a surface which minimizes the interaction of adhesive with the contents of a well plate would be a notable advance in the clinical and diagnostic fields.

BRIEF SUMMARY OF THE INVENTION

In accordance with the present invention a novel and useful sealing device for a surface is herein provided.

The device of the present invention utilizes a first layer of material which includes at least one hole, aperture or bore therethrough. The first layer of material includes a first side and a second side. A first adhesive layer attaches to the first side while a second adhesive layer attaches to the second side. Neither the first or second adhesive layers occluded the bore through the first layer. A coloration element may be provided by either the first material layer or the first adhesive layer or the second adhesive layer. In the latter case the first material layer and the first adhesive layer are translucent.

The second adhesive layer located on the second side of the first layer, is capable of adhering to a surface such as a well plate.

A second layer of material is found adjacent the first adhesive layer formed on the first layer of material. The second layer seals the contents of at least one well when the bore of the first layer overlies the well and the second adhesive layer fastens to the well plate. The second layer may be formed of a translucent material to allow the user to align the bore with the well of the well plate by employing the contrast afforded by the coloration element.

A third material layer may also be employed as a removable layer attached to the second adhesive layer on the second side of the first layer of material. The third layer may be scored to allow partial removal of the same with the retention of at least one tab to allow the user to handle the sealing device of the present invention with ease, when placed over a well plate.

In addition to the sealing device hereinabove described, the present invention involves a process for fabricating a sealing device for a surface which includes at least one well for holding contents. Such process includes the steps of providing a first layer of material having a first side and a second side. A first adhesive is located at the first side of the first layer. A coloration element is also applied selectively to the first material layer, first adhesive layer, and second adhesive layer simultaneously with the provision of the first material layer and the first adhesive layer. The second adhesive layer is located on the second side of the first layer and is capable of adhering to a surface, such as a well plate. Subsequently, a second layer is located adjacent the first adhesive and adheres to the same.

A bore, hole, or aperture is then formed through the first layer, first adhesive layer, second adhesive layer and second layer. The second layer is then removed from the first adhesive layer to be replaced by another layer which adheres to the first adhesive layer and overlies the bore through the first layer.

In certain cases, a third layer may be used to adhere to the second adhesive layer prior to the formation of the bore. The third layer would also be removed and replaced by a substitute layer in the form of a peelable sheet which allows the user to apply the sealing device to the well plate.

Also, the second layer may be formed of a transparent material, while the coloration element, found at either the first material layer, first adhesive layer, or the second adhesive layer, provides a contrast and aids the user in placement of the sealing device on a well plate. Where the coloration element is placed in the second adhesive layer, the first adhesive layer and the first material layer would be formed of translucent material. The finished sealing device may be formed into a roll.

It may be apparent that a novel and useful sealing device and process has been hereinabove described.

It is therefore an object of the present invention to provide a sealing device for a well plate which is capable of isolating individual wells in the well plate and minimizing interaction of adhesives used in the sealing device with the contents of the well plate or testing devices.

It is another object of the present invention to provide a sealing device for a well plate which is simple to align and apply to a well plate.

Another object of the present invention is to provide a sealing device for a surface which is relatively simple to manufacture.

A further object of the present invention is to provide a sealing device for a surface which includes a zone capable of being pierced which is completely adhesive-free.

Another object of the present invention is to provide a sealing device for a surface which includes inert and chemical resistant components.

A further object of the present invention is to provide a process for manufacturing a sealing device for a surface which minimizes the interaction between adhesives used in the sealing device and the contents of a chamber formed by the sealing device and the surface.

Yet another object of the present invention is to provide a process for fabricating a sealing device for a surface which permits manufacturing of the same in a relatively simple and inexpensive fashion.

The invention possesses other objects and advantages especially as concerns particular characteristics and features thereof which will become apparent as the specification continues.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
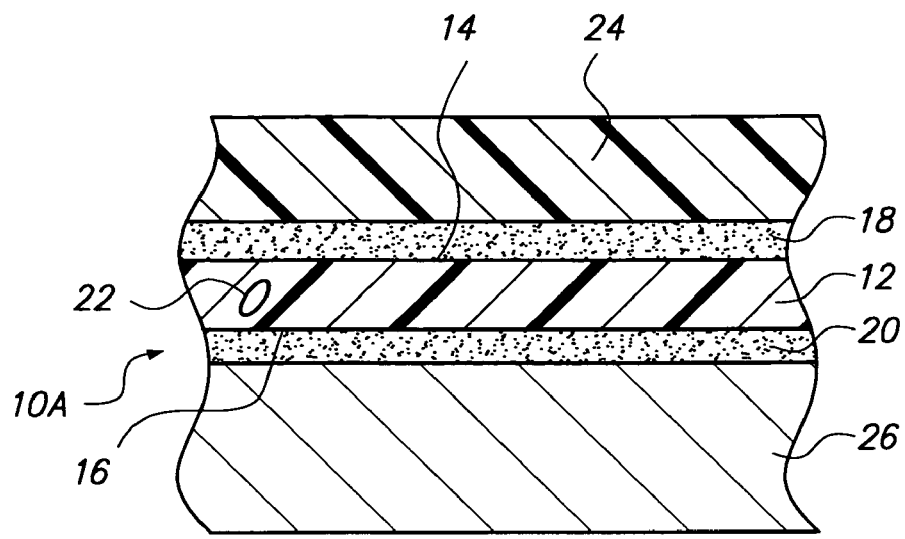
FIG. 1 is a sectional view of the sealing device of the present invention including temporary layers.

The invention as a whole is shown in the drawings by reference character 10. With reference to FIG. 1, embodiment 10A is depicted in which the device of the present invention includes temporary elements. That is to say, the sealing device 10A possesses a first layer 12 which may be formed of a sheet of material such as polypropylene. First layer 12 includes a first side 14 and a second side 16. First adhesive layer 18 is coated upon first side 14 of first layer 12, while second adhesive layer 20 is coated upon second side 16 of first layer 12. Such adhesive layers 18 and 20 may be formed of acrylic solvent-based or other suitable material. Material layer 12 may also include a coloration element 22. Alternatively, adhesive layer, 18 or 20 may be formed with a coloration element 22. In the latter case first adhesive layer 18 and first material layer 12 would be formed of translucent material. As depicted in the preferred embodiment of FIG. 1, layer 12 includes pigment 22 (shown partially) which is a result of the manufacturing of the same. Pigment 22 may also be imprinted on layer 12, or an adhesive layer 18 or 20.

With further reference to FIG. 1, it may be observed that a second layer 24 overlies adhesive layer 18 which is coated upon first side 14 of first layer 12. Second layer 24 may be formed of a suitable material such as paper, plastic, and the like. In addition, a third layer 26, which may be paper, is placed over second adhesive layer 20 and held thereto. As noted above, sealing device 10A represents an embryonic form of finished sealing device 10A of the present invention, best depicted in FIGS. 4 and 6.

Figure 2:
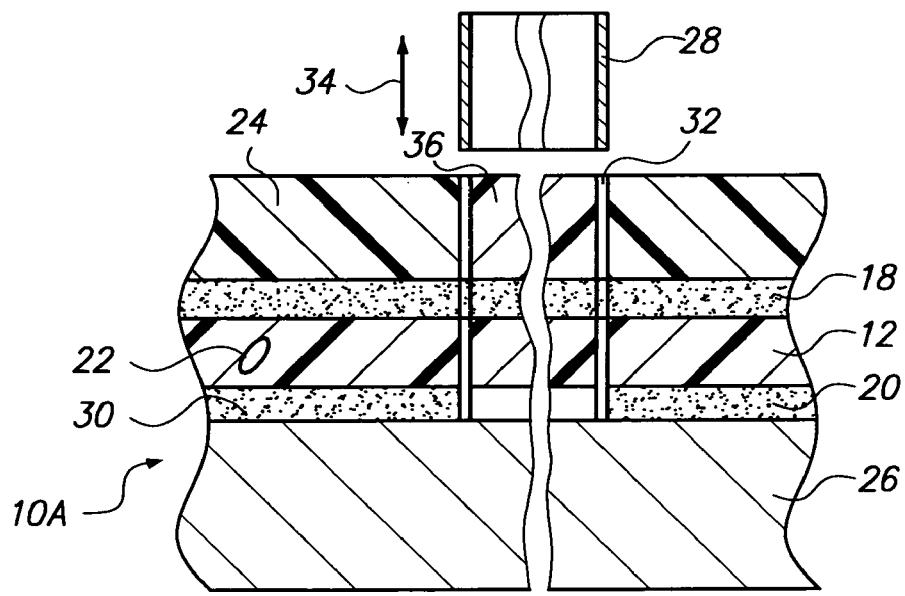
FIG. 2 is a sectional view of the sealing device of the present invention being cut by a die, depicted in broken configuration.

Turning to FIG. 2, it may be seen that sealing device 10A is altered by the use of a cutting tool or die 28, shown schematically in FIG. 2. Cutting tool or die 28 is pressed downwardly through a second layer 24, first adhesive layer 18, first layer 12, second adhesive layer 20 and to the upper surface 30 of third layer 26. Die 28 forms an aperture, hole or bore 32 through these elements and is removed after such formation, directional arrow 34. Although bore 32 is depicted in the drawing as being cylindrical such bores may take other cross-sectional configurations, i.e. rectangular, square, triangular, etc. Cut-out portion 36 of second layer 24, adhesive layer 18, first layer 12, and second adhesive layer 20 lies at or near upper surface 30 of third paper layer 26, at this juncture.

Figure 3:
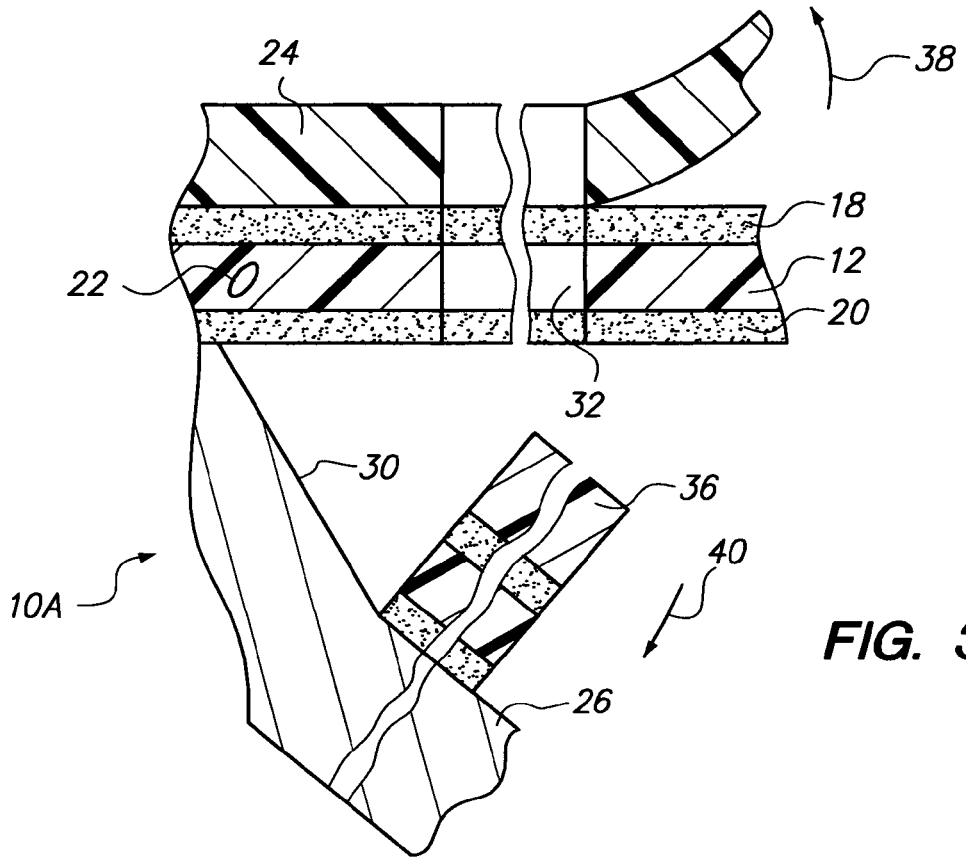
FIG. 3 is a sectional view of the bored sealing device of the present invention with an indicated removal of the temporary layers thereof and the material formerly within the bore.

With reference to FIG. 3, it may be apparent that first layer 24 and second layer 26, sandwiching first layer 12, are peeled or removed from adhesive layers 18 and 20, respectively, and are discarded. Directional arrows 38 and 40 indicate removal of layers 24 and 26 from sealing device 10A. It should be noted that cut-out portion 36, at or near upper layer 30 of third layer 26, is also discarded at this time.

Figure 4:
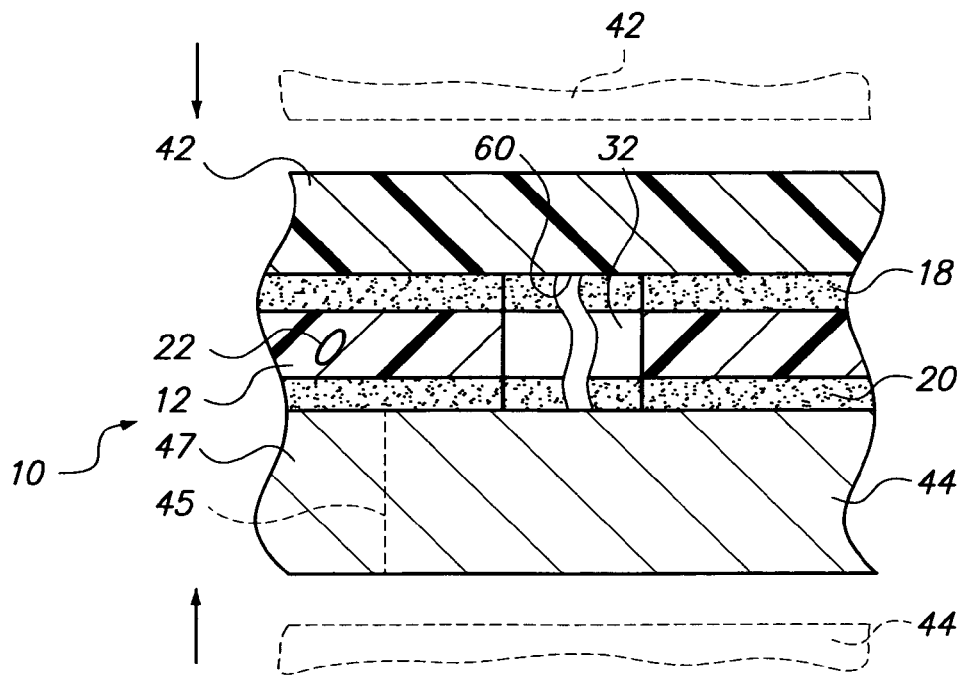
FIG. 4 is a sectional view of the fully assembled sealing device of the present invention with the placement of the final layers to the adhesive layers.

Referencing now FIG. 4, it should be pointed out that a new second layer 42 is placed over adhesive layer 18. Second layer 42 may be formed of polyethylene and the like, is preferably translucent or transparent. Likewise, an optional new third layer 44 overlies second adhesive layer 20 and is removably placed thereupon. Third layer 44 includes at least one score 45 which permits the easy removal of layer 44 and forms a tab 47 which facilitates the handling of sealing device 10A. FIG. 4 represents the sealing device 10A in its finished form for use on a surface, such as a well plate 50, described hereinafter.

Figure 8:
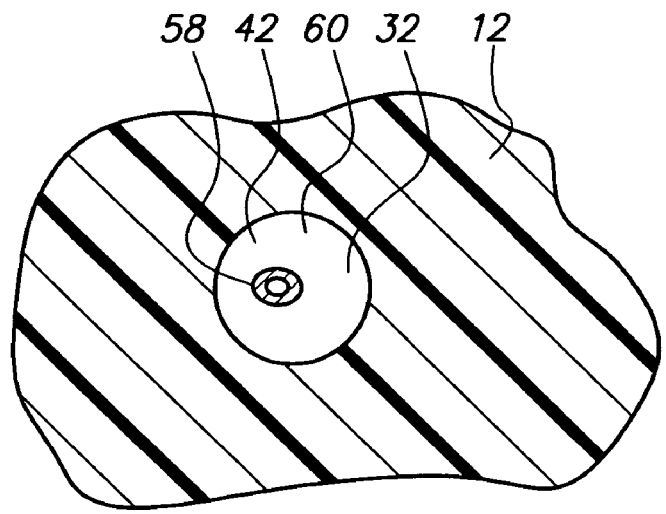
FIG. 8 is a sectional view taken along line 8-8 of FIG. 6.

FIG. 8 reveals that the bore or hole 32 in device 10B is covered by the adhesive-free zone or surface 60 of second layer 42. Thus, no adhesive touches cannulae 58 or enters well 52 from surface 60, FIG. 6.

Figure 5:
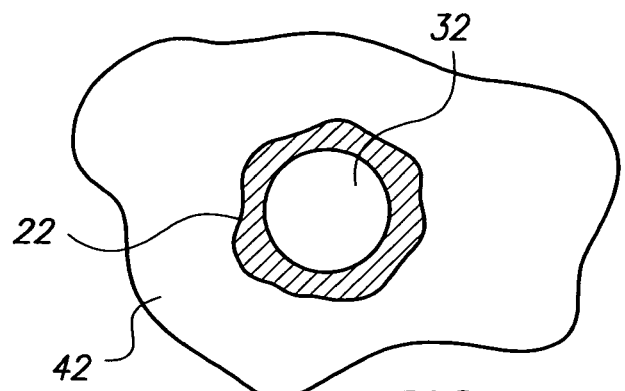
FIG. 5 is a partial top plan view of the sealing device of the present invention showing a single bore and coloration element providing contrast for alignment.
Figure 6:
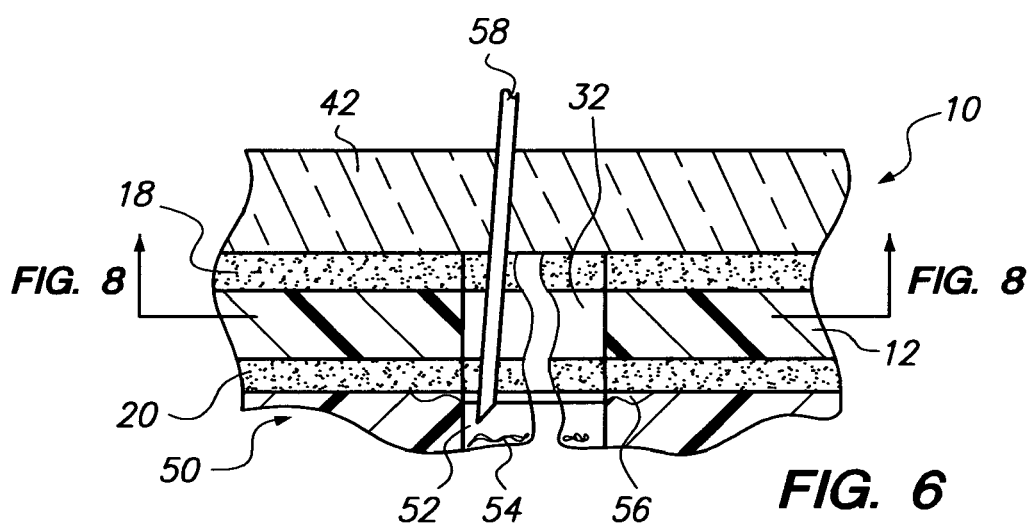
FIG. 6 is a sectional view of the sealing device of the present invention in which a hypodermic needle has penetrated one of the layers and extends into the well of a well plate.
Figure 7:
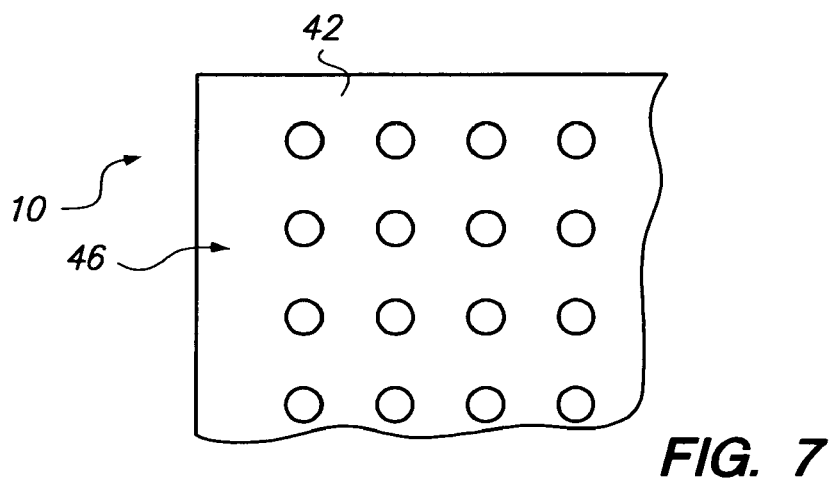
FIG. 7 is a partial top plan view of the sealing device of the present invention showing multiple bores.

In operation, the user takes the sealing device 10A of FIG. 4 and places the same over a surface or a well plate having the wells arranged in rows and columns. FIG. 7 shows a top plan view of device 10 having multiplicity of bores 46 each identical to bore 32 as shown in prior figures. It should be noted that sealing device 10 may be produced as a roll or precut into sheets. Turning to FIG. 5, it may be observed that the user would see the coloration element 22 either provided by first layer 12, first adhesive layer 18, or second adhesive layer 20 as well as a circular opening representing bore 32. Transparent layer 42 permits the user to align plurality of bores 46 with the plurality of wells of a well plate through the contrast afforded by coloration element 22 and translucent or transparent second layer 42. With reference to FIG. 6, it may be further seen that adhesive layer 20 has been exposed by the removal of third layer 44, of FIG. 4, from sealing device 10, preferably along score line 45. Adhesive layer 20 adheres to the upper surface 48 of a well plate 50, shown partially in FIG. 6. Well plate 50 includes a well 52 which holds certain contents 54, which may be chemical or biological material. Bore 32 generally overlies well 52 such that adhesive layer 20 contacts optional rim 56 of well plate 50 surrounding well 52. Thus, only a very small portion of adhesive layer 20 is exposed to well 52. In addition, second layer 42 may be formed of penetrable material (capable of being pierced), such as polyethylene. Hypodermic needle cannula 58 is shown as having passed through second layer 42 for entry into well 52, thus, breaking the seal afforded by second layer 42 over well 52. It should be noted that cannula 58 does not contact any adhesive in this regard.

Figure 9:
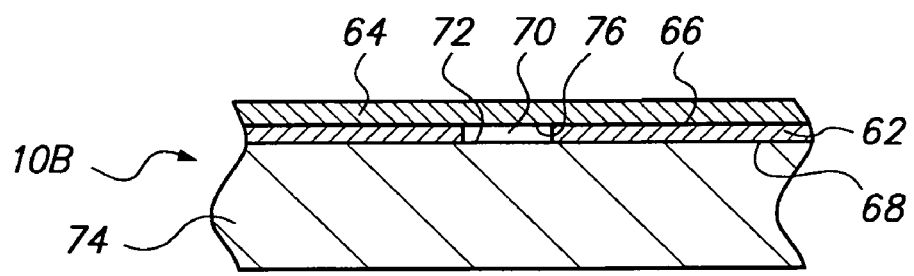
FIG. 9 is a schematic sectional view of another embodiment of the present invention in use over a surface.

Embodiment 10B of the present invention, FIG. 9, is shown with a first layer 62 and second layer 64. Adhesive layers 66 and 68 are depicted by thickened lines. A chamber 70 is formed between device 10B and surface 72 of object 74. Again, as is the case with embodiment 10A, an adhesive-free zone or surface 76 of second layer 64, covers surface 72, which may contain any item of interest to the user.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A process for fabricating a sealing device for a well plate, comprising:
   a. providing a first layer having a first side and a second side;
   b. locating a first adhesive layer to said first side of said first layer;
   c. locating a second adhesive to said second side of said first layer, said second adhesive being capable of adhering to the well plate;
   d. providing a second layer to adhere to said first adhesive layer of said first side of said first layer;
   e. forming a bore through said first layer, first adhesive layer, second adhesive layer and said second layer;
   f. removing said entire second layer from said first adhesive layer;
   g. providing yet another layer to adhere to said first adhesive layer and to overlie said bore through said first adhesive layer, said first layer, and said second adhesive layer;
   h. selectively providing a coloration element at said first layer, said first adhesive layer, and said second adhesive layer simultaneously with said steps of locating a first adhesive layer to said first side of said first layer and providing a first layer having a first side and a second side.

2. The process of claim 1 which said second layer is formed of translucent material.

3. The process of claim 1 which additionally comprises the step of adhering said second adhesive layer to the well plate.

* * * * *